(12) United States Patent
Zhang et al.

(10) Patent No.: US 7,675,982 B2
(45) Date of Patent: Mar. 9, 2010

(54) METHOD AND SYSTEM FOR REDUCING PEAK-TO-AVERAGE POWER FOR OFDM SIGNALS

(75) Inventors: Jinyun Zhang, Cambridge, MA (US); Xiaozhou Huang, Baton Rouge, LA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1116 days.

(21) Appl. No.: 11/287,669

(22) Filed: Nov. 28, 2005

(65) Prior Publication Data

US 2007/0121483 A1 May 31, 2007

(51) Int. Cl.
*H04L 27/28* (2006.01)
*H04L 25/49* (2006.01)

(52) U.S. Cl. ........................ 375/260; 375/296

(58) Field of Classification Search ................ 375/260, 375/285, 295–297; 455/501, 67.13, 114.2, 455/114.3
See application file for complete search history.

(56) References Cited

U.S. PATENT DOCUMENTS

| | | | | |
|---|---|---|---|---|
| 6,075,411 | A * | 6/2000 | Briffa et al. ................. | 330/149 |
| 6,240,141 | B1 * | 5/2001 | Long ........................... | 375/260 |
| 7,075,999 | B2 * | 7/2006 | Redfern ....................... | 375/260 |
| 7,292,639 | B1 * | 11/2007 | Demirekler et al. .......... | 375/260 |
| 7,386,060 | B2 * | 6/2008 | Jaenecke et al. ............. | 375/296 |
| 7,409,009 | B2 * | 8/2008 | Akhtman ..................... | 375/296 |
| 2005/0254587 | A1 | 11/2005 | Kim et al. | |
| 2006/0126748 | A1 * | 6/2006 | Lin et al. ..................... | 375/260 |
| 2007/0121736 | A1 * | 5/2007 | Clausen et al. .............. | 375/260 |

OTHER PUBLICATIONS

A. Saul: "Analysis of Peak Reduction in OFDM Systems Based on Recursive Clipping," in Proc. of Int. OFDM-Workshop, vol. 1, Hamburg, Germany, Sep. 24-25, 2003.
J.Amstrong: "Peak-to-average power reduction for OFDM by repeated clipping and frequency domain filtering." Nov. 23, 2001.
A. Saul: "Peak Reduction for OFDM by Shaping the Clipping Noise." Sep. 26, 2004.
Ali Behravan and Thomas Eriksson: "PAPR and Other Measures for OFDM Systems with Nonlinearity." Oct. 27, 2002.
S. H. Muller and J. B. Huber, "OFDM with reduced peak to average power ratio by optimum combination of partial transmit sequences," *Electronics Letter*, vol. 33, No. 5, pp. 368-369, Feb. 1997.
R. W. Bäuml, R. F. H. Fisher and J. B. Huber, "Reducing the peak-to-average power ratio of multicarrier modulation by selected mapping," *Electronics Letter* vol. 32, No. 22, pp. 2056-2057, Oct. 1996.
ETSI Digital Video Broadcasting (DVB); Framing structure, channel coding and modulation for digital Terrestrial television (DVB-T), Aug. 1997, ETS 300 744.

* cited by examiner

*Primary Examiner*—Khanh C Tran
(74) *Attorney, Agent, or Firm*—Dirk Brinkman; Gene Vinokur (57) ABSTRACT

The invention provides a system and method for effectively reducing peak-to-average power ratio (PAPR) in an OFDM signal. The method includes the steps of oversampling a signal in the time domain, gradually clipping an amplitude of the signal to a predefined level using a formula involving a hyperbolic tangent, bandpass filtering out-of-band spectral components of the signal due to non-linear clipping to be within a predetermined mask, and transmitting the signal.

10 Claims, 8 Drawing Sheets

METHOD AND SYSTEM FOR REDUCING PEAK-TO-AVERAGE POWER FOR OFDM SIGNALS

FIELD OF THE INVENTION

This invention relates to wireless communication systems, and more particularly to a method and system for reducing peak-to-average power ratio (PAPR) in orthogonal frequency division multiplexed (OFDM) signals.

BACKGROUND OF THE INVENTION

Orthogonal frequency division multiplexing (OFDM) modulates information symbols over a number of individual subcarriers. An OFDM signal includes multiple subcarriers modulated at different equi-spaced frequencies, which are orthogonal to each other. OFDM modulation is an effective modulation schema for transmission data at high rate over multipath fading channels. As an advantage, OFDM can be used in broadband digital communication applications because of its high spectral efficiency and robustness to the multipath fading channels. The IEEE 802.11 and IEEE 802.16 standards specify OFDM for high-speed wireless communications.

The IEEE standard 802.16-2004 defines two physical (PHY) layers called WirelessMAN-OFDM PHY and WirelessMAN-OFDMA PHY. The relevant portions of the standard include IEEE Std 802.16-2004, (Revision of IEEE Std 802.16-2001), IEEE Standard for Local and Metropolitan Area Networks Part 16: Air Interface for Fixed Broadband Wireless Access Systems, and IEEE P802.16e draft/D9, IEEE Standard for Local and Metropolitan Area Networks Part 16: Air Interface for Fixed and Mobile Broadband Wireless Access Systems; Amendment for Physical and Medium Access Control Layers for Combined Fixed and Mobile Operation in Licensed Bands.

In OFDM, the available bandwidth in a channel is divided into N narrowband subcarrier frequencies, which are transmitted in parallel. The data are transmitted concurrently over these N equally spaced carriers. The subcarriers are designed to have a minimum frequency separation required to maintain the orthogonality of their corresponding waveforms. OFDM uses an inverse fast Fourier transform (IFFT) to generate the signal waveforms. The WirelessMAN-OFDM in the IEEE Std 802.16-2004 is based on 256 IFFTs. The OFDMA PHY mode in the IEEE P802.16e draft/D9 includes the IFFT sizes 2048, backward compatible to IEEE Std 802.16-2004), 1024, 512 and 128. One of the major drawbacks of OFDM is varying amplitude in the transmitted signal.

The constructive summation of N exponential signals can result in a peak power that is N times the average power. One of the frequently used measurements for the peak power is the peak-to-average power ratio (PAPR):

$$PAPR = \frac{\max_{0 \leq t \leq NT} |x(t)|^2}{ave(|x(t)|^2)} = \frac{\max_{0 \leq t \leq NT} |x(t)|^2}{1/(NT) \int_{t=0}^{NT} |x(t)|^2 dt}, \quad (1)$$

where x(t) is the OFDM transmitted signal, T is the sampling period, and N is the number of subcarriers for a OFDM symbol.

As the number of subcarriers in the OFDM signal increases, the amplitude of the OFDM signal becomes more like noise with a very large dynamic range. Therefore, the RF power amplifier (PA) in the transmitter should have a large input backoff, where the power conversion is inefficient. For example, the maximum power efficiency of a Class B PA is 78.5%. However, this efficiency drops to 7.85% for an input signal with a PAPR of 10 dB. Hence, the DC power consumption is 1.3 Watts to achieve a power level of 100 mW. The high DC consumption can decrease battery lifetime. Thus, a method for reducing the PAPR for OFDM signals is desired.

A number of different techniques are known.

Block encoding: A. E. Jones, T. A. Wilkinson and S. K. Barton, "Block coding scheme for reduction of peak to mean envelope power ratio of multicarrier transmission schemes," Electronics Letters, vol. 30, no. 25, pp. 2098-2099, December 1994. The codeword which reduces the PAPR is selected for transmission. There are some code sequences, for example, Shapiro-Rudin sequences, Golay codes, M-sequences, Binary Barker, and Newman phases, that have reduced PAPR. However, block encoding needs an exhaustive search for good codes. As N increases, this becomes impossible.

Selective mapping: R. W. Bäuml, R. F. H. Fisher and J. B. Huber, "Reducing the peak-to-average power ratio of multicarrier modulation by selected mapping," Electronics Letters, vol. 32, no. 22, pp. 2056-2057, October 1996. The transmitter generates a set of candidate data blocks for the same information data block. The best mapping that has the lowest PAPR is selected for transmission. For implementation, the transmitter needs some IFFT operations, and determines the corresponding PAPR for these sequences. The side information of which candidate is used has to be transmitted with the information data block to the receivers. The complexity increases as the number of candidates increases.

Partial transmit sequences: S. H. Muller and J. B. Huber, "OFDM with reduced peak to average power ratio by optimum combination of partial transmit sequences," Electronics Letters, vol. 33, no. 5, pp. 368-369 February 1997. The information data block of N symbols is partitioned into subblocks. The subcarriers in each subblock are weighted by a phase factor. The phase factors are selected such that the resulted PAPR is minimized. In general, the phase factors are limited to W elements to reduce the complexity. The side information of which phase factors is used is transmitted with the information data block to the receivers. The complexity increases as W increases.

Interleaving: P. V. Eetvelt, G. Wade and M. Tomlinson, "Peak to average power reduction for OFDM schemes by selective scrambling," Electronics Letters, vol. 32, no. 21, pp. 1963-1964, October 1996. A set of interleavers is used to find the sequences having the minimum PAPR. The side information about which interleaver is used must be transmitted to the receivers. This method has the same problem for all the methods that need side information because an error in the side information can result in the lost of the transmitted signal.

Tone reservation and tone injection: J. Tellado, "Peak to average power reduction for multicarrier modulation," Ph.D. dissertation, Stanford Univ., 2002. In one OFDM symbol, some subcarriers are reserved for PAPR reduction. The transmitted values for these subcarriers are determined by solving a convex optimization problem. The amount of PAPR reduction depends on the number of reserved subcarrier and their locations. For an IEEE 802.16 adaptive burst transmission, some subcarriers experiencing lower SNR can be used for this purpose. However, the subcarrier locations used for PAPR reduction should be changed adaptively. This leads to additional complexity. If the subcarrier locations are fixed, then bandwidth is reduced. Tone injection increases the size of a constellation such that each of the constellation points in the original constellation is mapped into several constellation points. Each transmitted symbol in the data block can be mapped into one of several equivalent constellation points. The problem with tone injection is that this technique can increase the power.

Peak windowing: M. Pauli and H. P. Kuchenbecker, "On the reduction of the out of band radiation of OFDM signals," *IEEE conference proceedings ICC*, vol. 3, pp. 1304-1308, 1998. In this method, the PAPR is reduced by multiplying the large peak signal with a Gaussian window. PAPR reduction is achieved at the expense of out-of-band spectral components and in-band noise.

Companding: X. Wang, T. T. Tjhung, and C. S. Ng, "Reduction of peak-to-average power ratio of OFDM system using a companding technique," *IEEE Transactions on Broadcasting*, vol. 45, no. 3, pp. 303-307, September 1999. This idea is similar to companding a speech signal. Because the OFDM signal is similar to speech in the sense that large peaks occur infrequently, a μ-law companding technique can be used to reduce the PAPR. However, companding also causes out-of-band spectral components, and symbol error rate improvement only occurs at higher SNR. The PAPR is reduced to approximately $\sqrt{N}$.

Amplitude clipping and filter: X. Li and L. Cimini, "Effects of clipping and filtering on the performance of OFDM," IEEE Communication Letters, vol. 2, no. 5, pp. 131-133, May 1998, and H. A. Suraweera, K. Panta, M. Feramez and J. Armstrong, "OFDM peak-to-average power reduction scheme with spectral masking," Symposium on Communication Systems Networks and Digital Signal Processing (CSNDSP 2004), July 2004. Amplitude clipping limits the peak envelope of the input signal to a predetermined value. The noise caused by the non-linear properties of the clipping function falls both in-band (BER performance degradation) and out-of-band (spectral efficiency reduction). Filtering after the clipping can reduce the out-of-band noise. The most frequently used amplitude clipping operation is given by $$x'_n = \begin{cases} x_n, & |x_n| < A \\ Ae^{j\phi_n}, & |x_n| \geq A \end{cases} \quad (2)$$

where $\phi_n$ is the phase of $x_n$ and A is the pre-defined clipping level. This method is referred as hard clipping (HC). The masking of Suraweera et al. only removes a portion of the OOB radiation using hard clipping. They oversample by inserting many zeros in the transmitted signals in the frequency domain. This requires a very large value of the IDFT to generate the oversampled signal.

Most of the above techniques increase computational complexity and some of techniques decrease efficiency because side information is needed. Furthermore, there is another potential problem associated with techniques that need the side information. The error in the side information can result in the loss of whole transmitted signal.

SUMMARY OF THE INVENTION

One embodiment of the invention provides a system and method for reducing peak-to-average power ratio (PAPR) in an OFDM signal. The method includes the steps of oversampling a signal, gradually clipping amplitude of the signal to a predefined level using a formula involving a hyperbolic tangent, bandpass filtering out-of-band spectral components of the signal due to non-linear clipping to be within a predetermined mask, and transmitting the signal.

As an advantage, there is no significant reduction in spectrum efficiency because side information is not required as it is in the prior art. A low and controllable amount of signal degradation, in terms of bit error rate, can be compensated for by a channel coding scheme, such as turbo coding. The transmitted signal is compatible with existing standards using OFDM, such as DVB-T, IEEE 802.11 and IEEE 802.16, and can be implemented entirely in a transmitter.

The method is independent of the source coding, channel coding, modulation scheme, and pilot insertion. In contrast with the prior art, all of the out-of-band radiation is removed using filtering in the frequency domain. The oversampling rate is relatively low, e.g., four, and is performed in the time domain using linear interpolation, instead of in the frequency domain as in the prior art. Soft clipping is performed gradually to achieve a better BER for the same amount of PAPR reduction, in contrast with the hard clipping of the prior art.

DETAILED DESCRIPTION OF PREFERRED EMBODIMENTS

Figure 1:
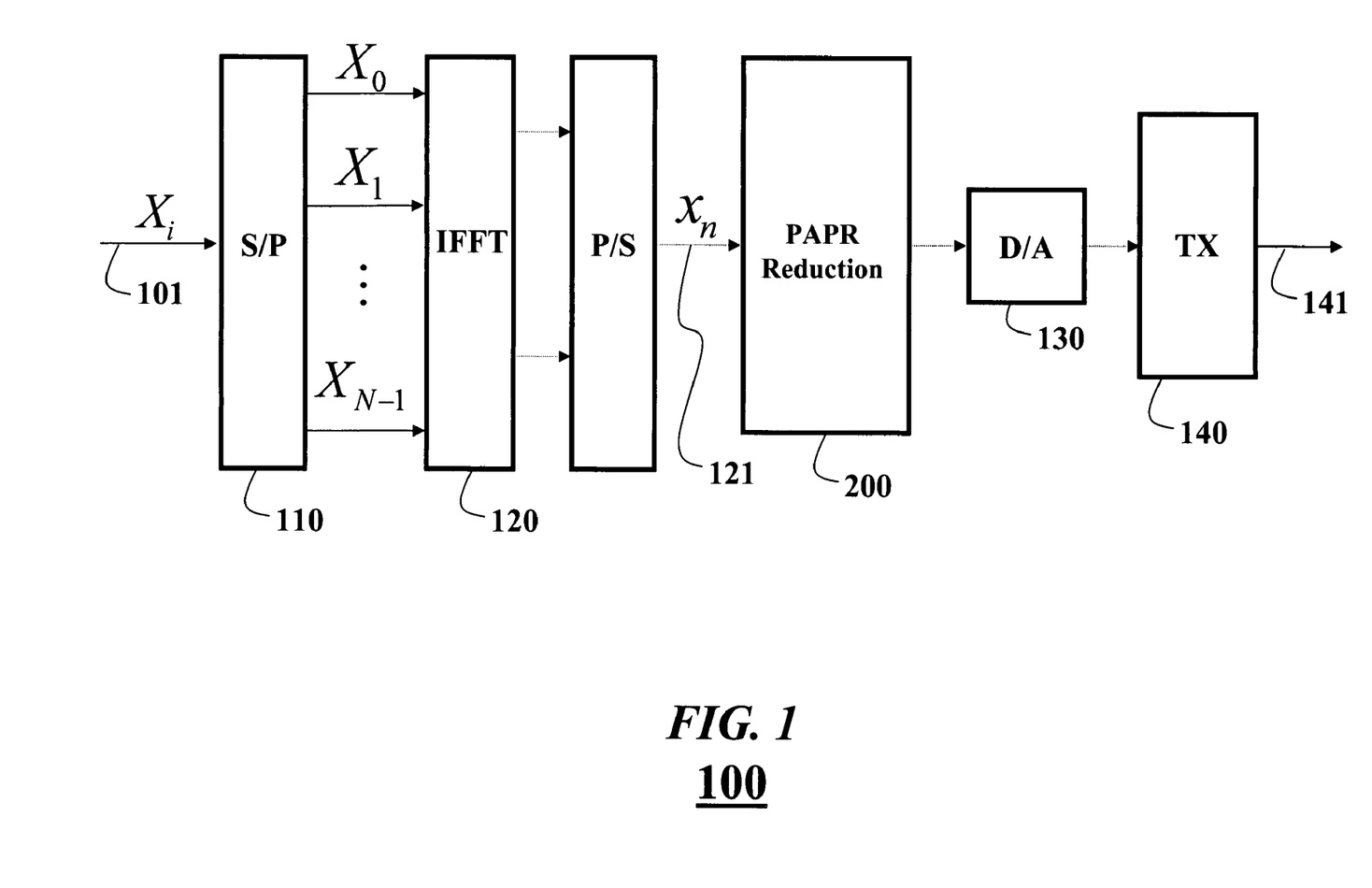
FIG. 1 is a diagram of an OFDM transmitter system including PAPR reduction according to an embodiment of the invention.

FIG. 1 shows a system and method 100 for reducing peak-to-average power ratio (PAPR) in an orthogonal frequency division multiplexed (OFDM) signal. Serial to parallel (S/P) conversion 110 is applied to an input signal $x_i$ 101. An inverse fast Fourier transform (IFFT) 120 generates a complex-valued baseband signal 121

$$x_n = \frac{1}{\sqrt{N}} \sum_{k=0}^{N-1} (a_k + jb_k) e^{\frac{j2\pi kn}{N}}, \quad 0 \leq n \leq N - 1, \quad (3)$$

where N is the number of subcarriers in one OFDM symbol, $a_k$ and $b_k$ are the real and imaginary components of the complex-valued modulated symbols, which may be QPSK, 16-QAM, or 64-QAM modulated symbols. After appending a cyclic prefix, baseband signals are passed through a PAPR reduction block 200 according to the invention. The outputs of the PAPR reduction block 200 are fed to a digital to analog converter (D/A) 130 for generating an analog baseband signal. In-phase and quadrature-phase signals are used for conveying the real and imaginary components of the complex baseband signal. The analog baseband signal is fed into a radio frequency (RF) transmitter (TX) 140, where the transmitted signal 141 is up-converted to the desired RF carrier frequency and amplified.

Figure 2:
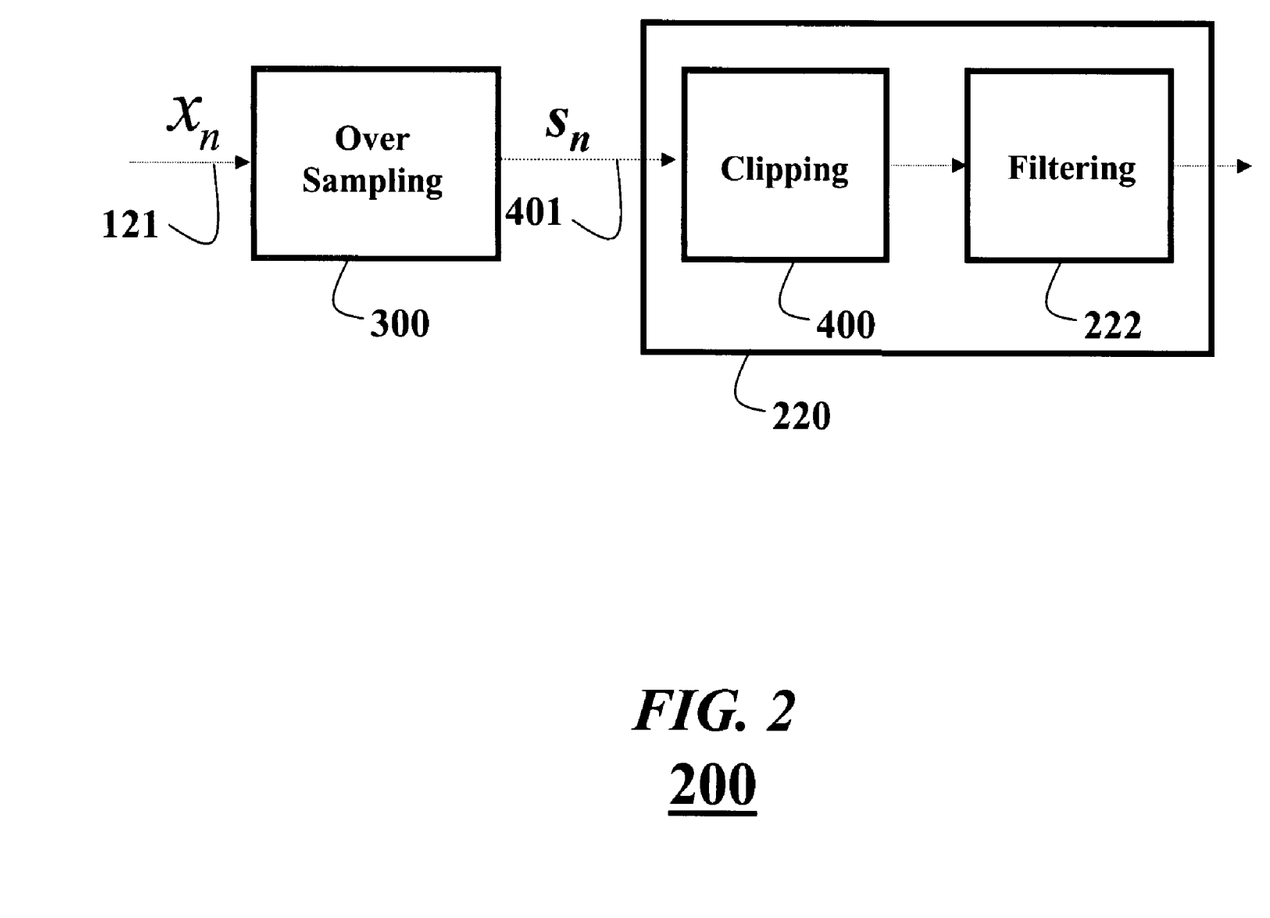
FIG. 2 is a block diagram of PAPR reduction according to an embodiment of the invention.

As shown in FIG. 2, the PAPR reduction 200 oversamples 300 the OFDM baseband signals $x_n$ 121 by a factor of N. In contrast with the prior art, the oversampling is performed in the time domain.

Each oversampled signal 401 is then passed through an amplitude clipper 400 and a filter 222 to remove the out-of-band spectral components. This clipping and filtering process 220 is iterated as the PAPR is reduced gradually until it satisfies a predetermined mask. In contrast with the prior art, the filtering is performed in the frequency domain using a linear filter. Because the power reduction is iterative, we call this 'soft' clipping, in contrast with the one-shot hard clipping of the prior art.

Figure 3:
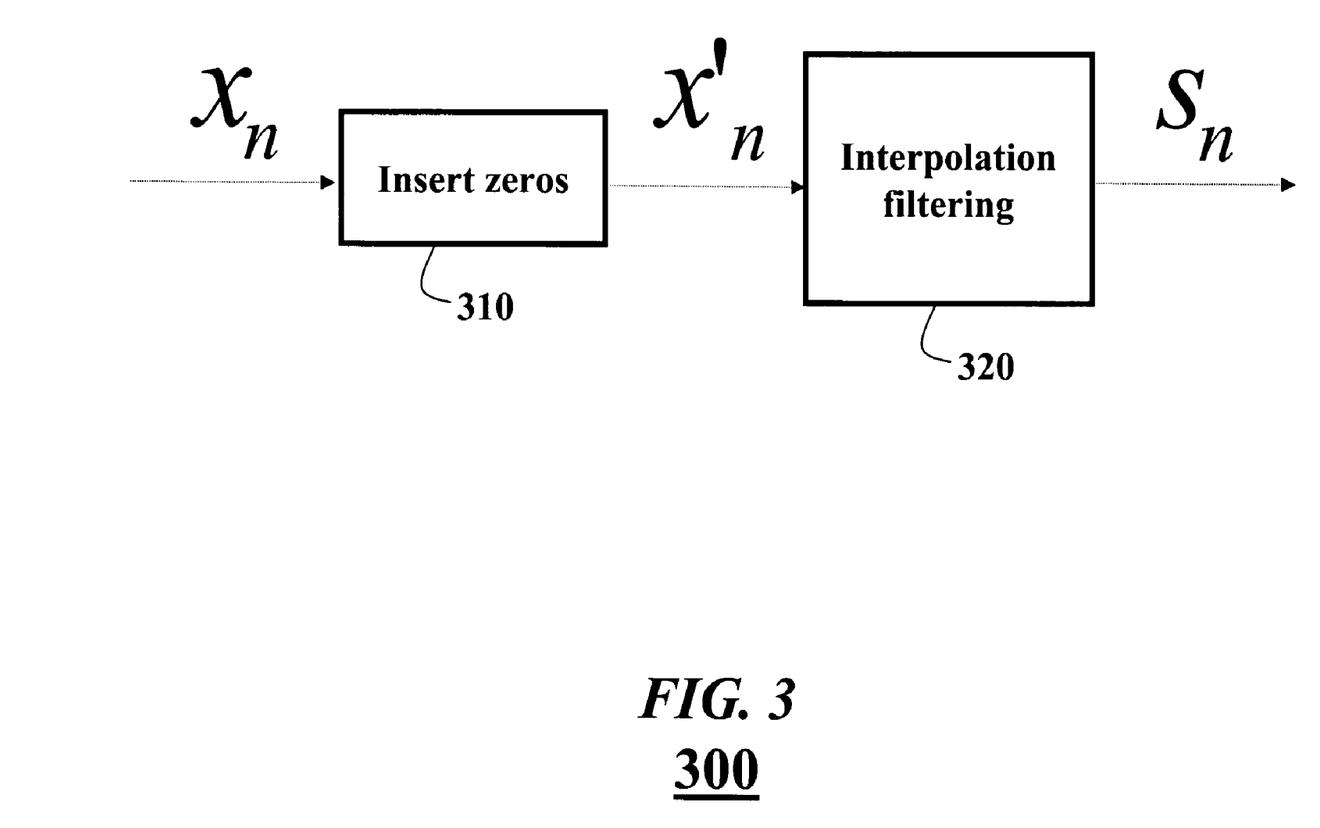
FIG. 3 is a block diagram of oversampling according to an embodiment of the invention.

FIG. 3 shows the oversampling process 300 in the time domain according to an embodiment of the invention. The oversampling can be implemented as two steps. First, inserting 310 (L-1) zeros between samples, the signal $x'_n$ is $$x'_n = \begin{cases} x_{n/L}, & n = 0, L, 2L, \ldots \\ 0, & \end{cases} \quad (4)$$

After inserting the zeros, the signal $x'_n$ is then interpolated 320 using an interpolation filter $$s_n = \sum_{l=0}^{L-1} f_l x'_{n-l}, \quad (5)$$

where n is the sample index, $f_l$ is the $l^{th}$ tap of the interpolation filter 320, $f_l, 0 \leq l \leq L-1$, and L is the filter length. The linear interpolation filter can have an impulse response $f_l = 1 - l/L, l = 0, \ldots, L-1$ Other interpolation filters, such as polynomial interpolation or cubic spline interpolation, can also be used.

Figure 4:
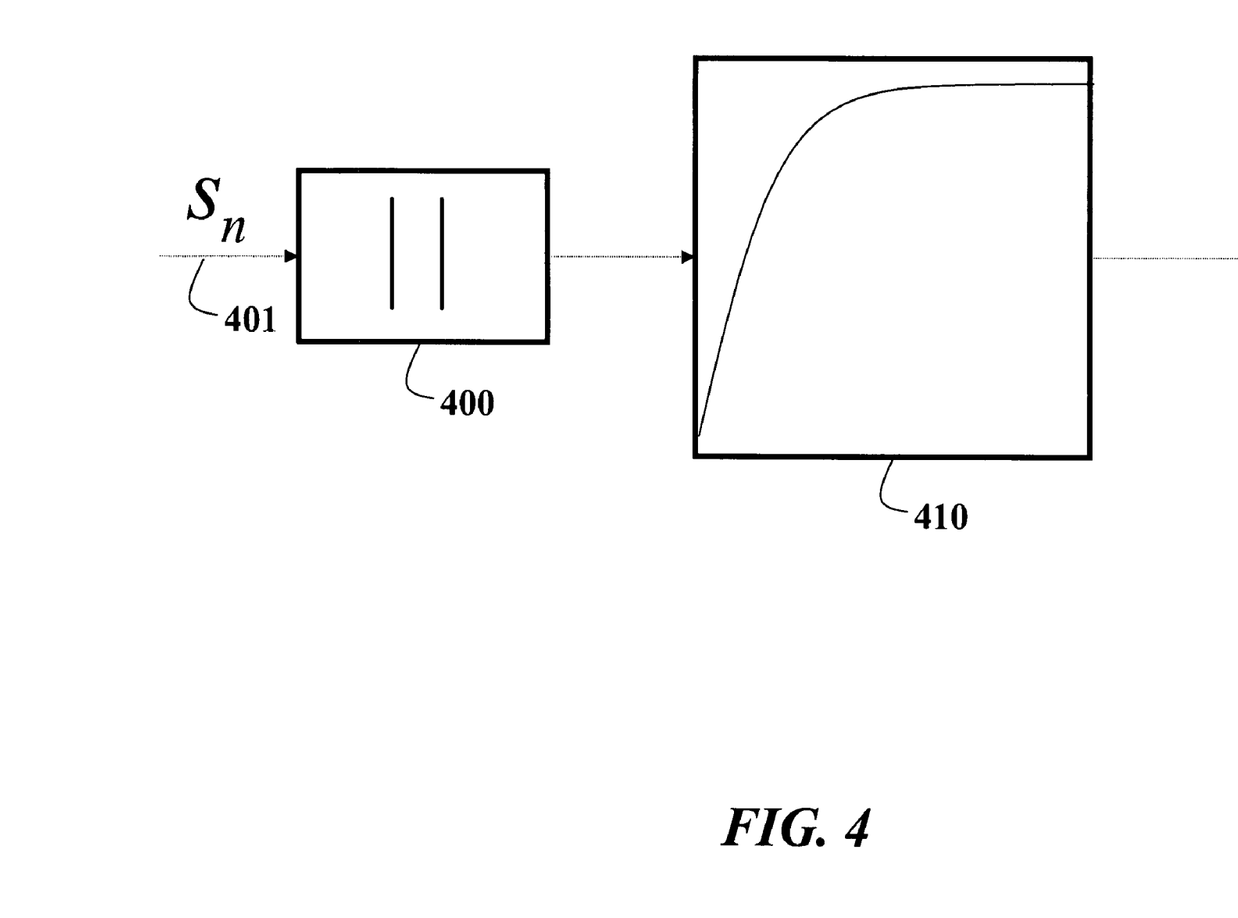
FIG. 4 is a block diagram of amplitude clipping according to an embodiment of the invention.

As shown in FIG. 4, after the oversampling, the amplitude of each sample in the oversampled signal $s_n$ 401 is gradually clipped 400 to a predefined level.

An amplitude clipping function 410 is a deliberate distortion according to a memoryless non-linear function. An underlying amplitude modulation of the function is given in Equation (6). The phase of the signal does not change. The signal $s_n$ 401 is deliberately clipped to a predefined level before the power amplifier. The clipping function takes the form of a hyperbolic tangent function, i.e., $s'_n = A \tanh(C|s_n|),$ (6)

where A and C are predefined constants based on the PAPR reduction requirement.

Figure 5:
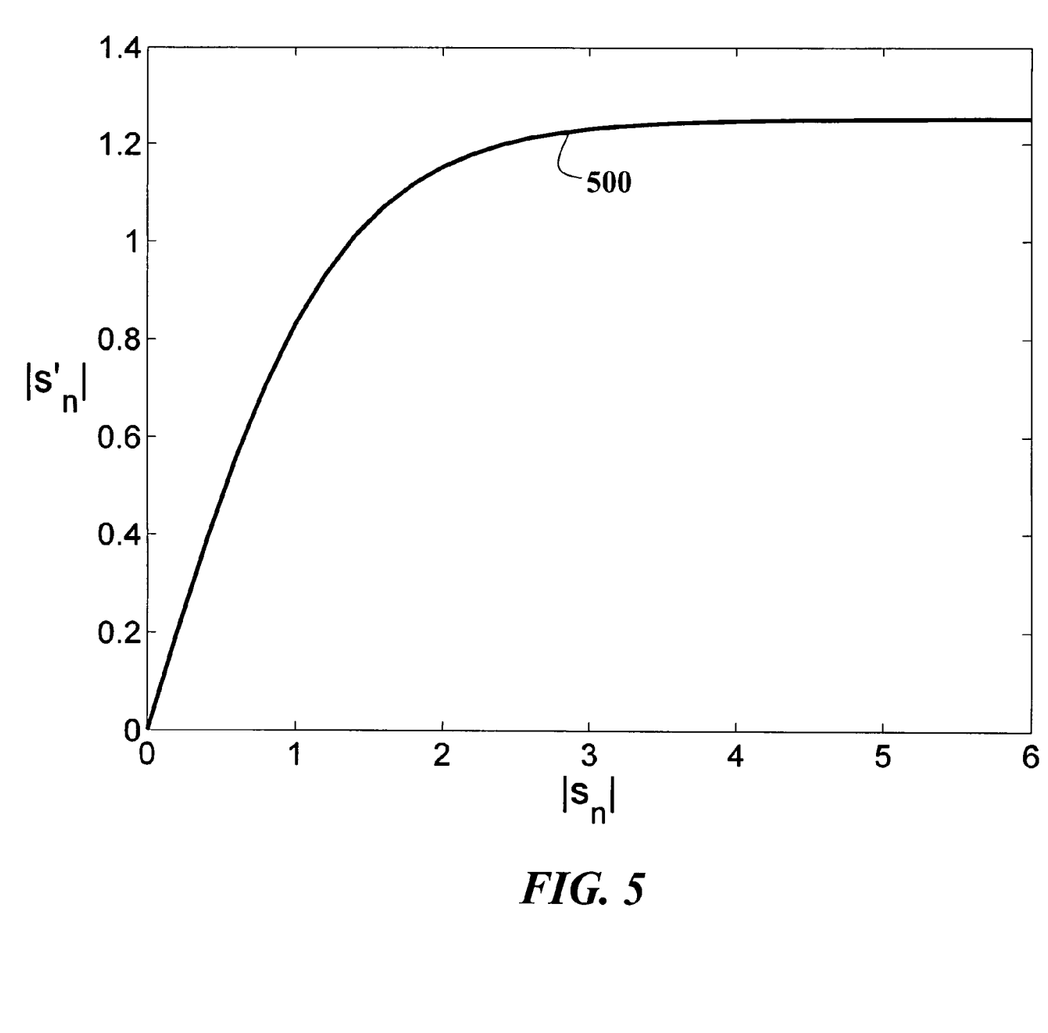
FIG. 5 is a graph of a magnitude clipping nonlinearity function according to an embodiment of the invention.

FIG. 5 shows an example of the amplitude clipping non-linearity function 500 for C=0.8, and A=1/0.6.

After amplitude 'soft' clipping, a bandpass filter 222 removes the out-of-band spectral components. Because the non-linear gradual clipping function is performed on the oversampled signal, this process may result in partial peak regrowth of the time domain signal. Therefore multiple iterations of the clipping 400 and filtering 222 can be used to reduce the PAPR iteratively, while suppressing out-of-band spectral emissions to an acceptable level based on a predefined out-of-band mask.

The pass-band of the filter function is limited to information-carrying frequency bandwidth of the modulated baseband signal. Attenuation in the stop-band satisfies a maximum tolerable out-of-band emission. The characteristics of the desired spectral mask for the filter are defined by the out-of-band emission requirements expressed in terms of the spectral mask imposed by the Federal Commission of Communications (FCC) on a power spectral density function of a particular OFDM signal.

Figure 6:
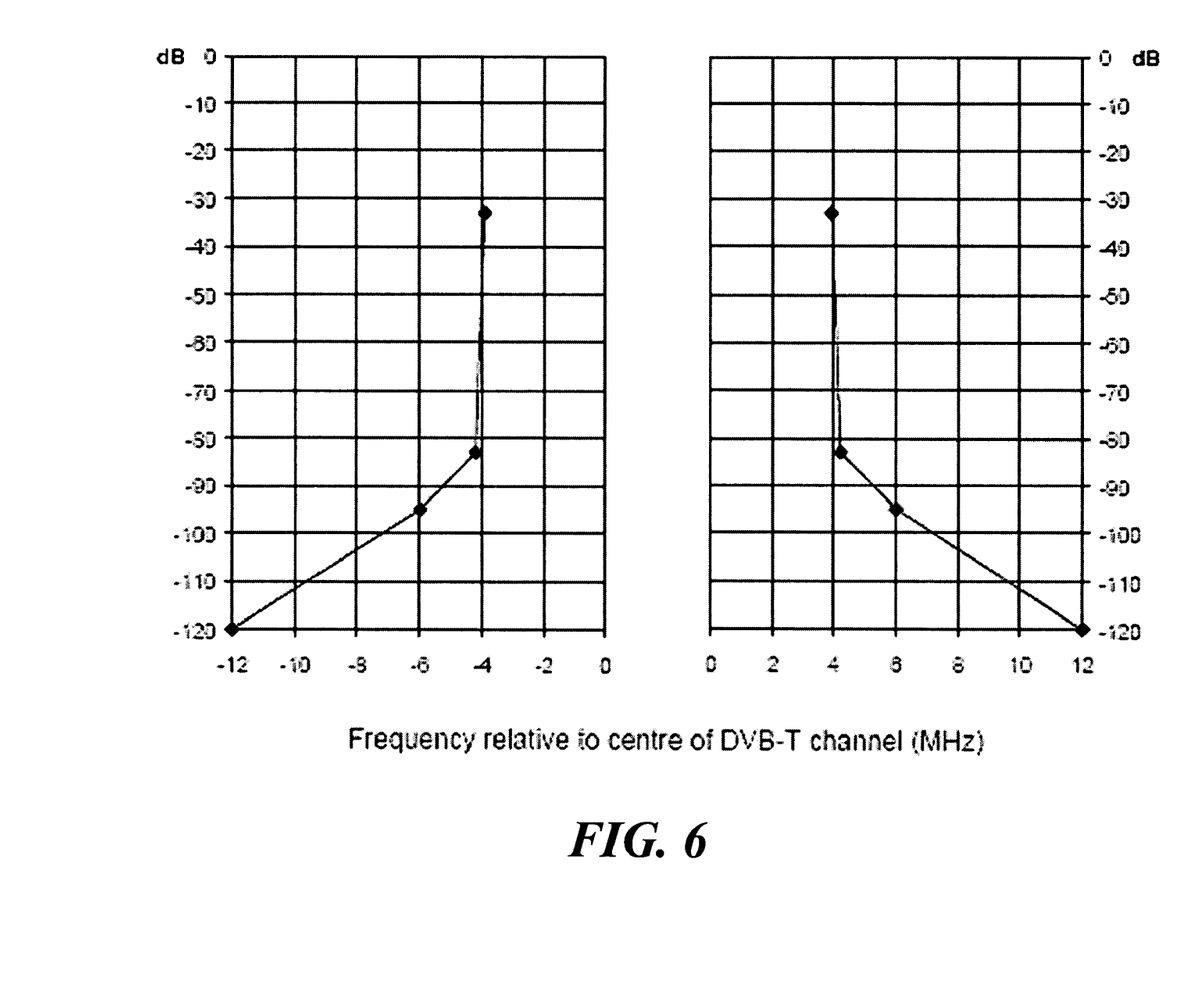
FIG. 6 is a graph of a spectral mask according to an embodiment of the invention.

FIG. 6 shows a specific example of a spectral mask for a DVB-T system, see ETSI Digital Video Broadcasting (DVB); Framing Structure, Channel Coding and Modulation for Digital Terrestrial Television (DVB-T), August 1997, ETS 300 744, incorporated herein by reference.

EFFECT OF INVENTION

One embodiment of the invention provides a practical system and method for reducing PAPR for OFDM signals according to the IEEE P802.16e standard draft/D9. In this example, the oversampling rate is four. The number of sub-carriers is 1024. Transmitted information symbols are modulated according to QPSK. Frequency domain filtering removes all the out-of-band spectral components.

Figure 7:
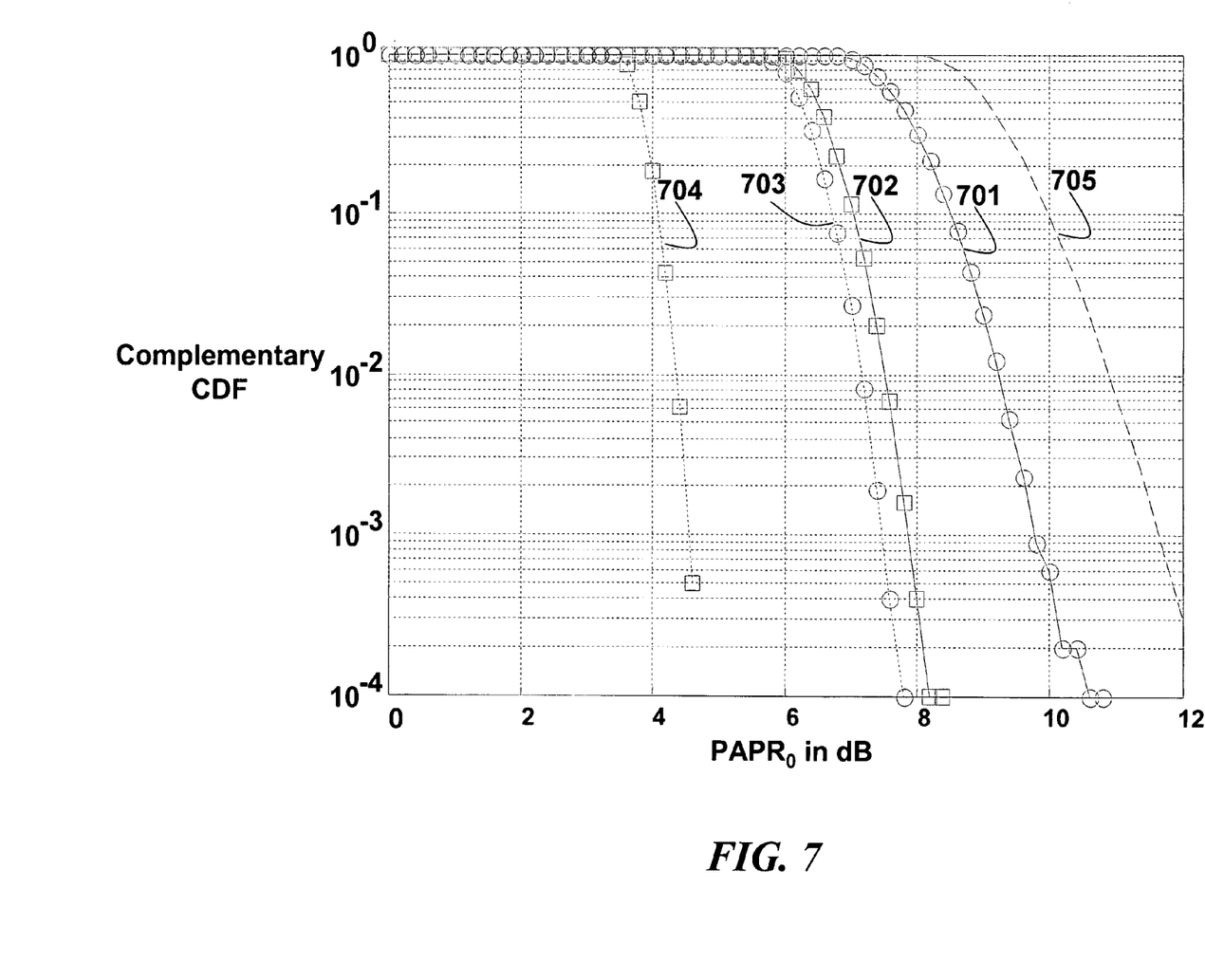
FIG. 7 is a graph of PAPR reduction performance according to an embodiment of the invention.

FIG. 7 shows the PAPR reduction 701-704, compared to the original signal without clipping 705, due to 1st amplitude soft clipping with C=0.2, 2nd amplitude soft clipping with C=0.2, 1st amplitude soft clipping with C=0.4, and 1st amplitude soft clipping with C=0.4, respectively. The horizontal axis is the complementary CDF of PAPR, which is defined as Complementary $CDF$=Probability($PAPR$>$PAPR_0$), (7)

while $PAPR_0$ is shown on the vertical axis.

Figure 8:
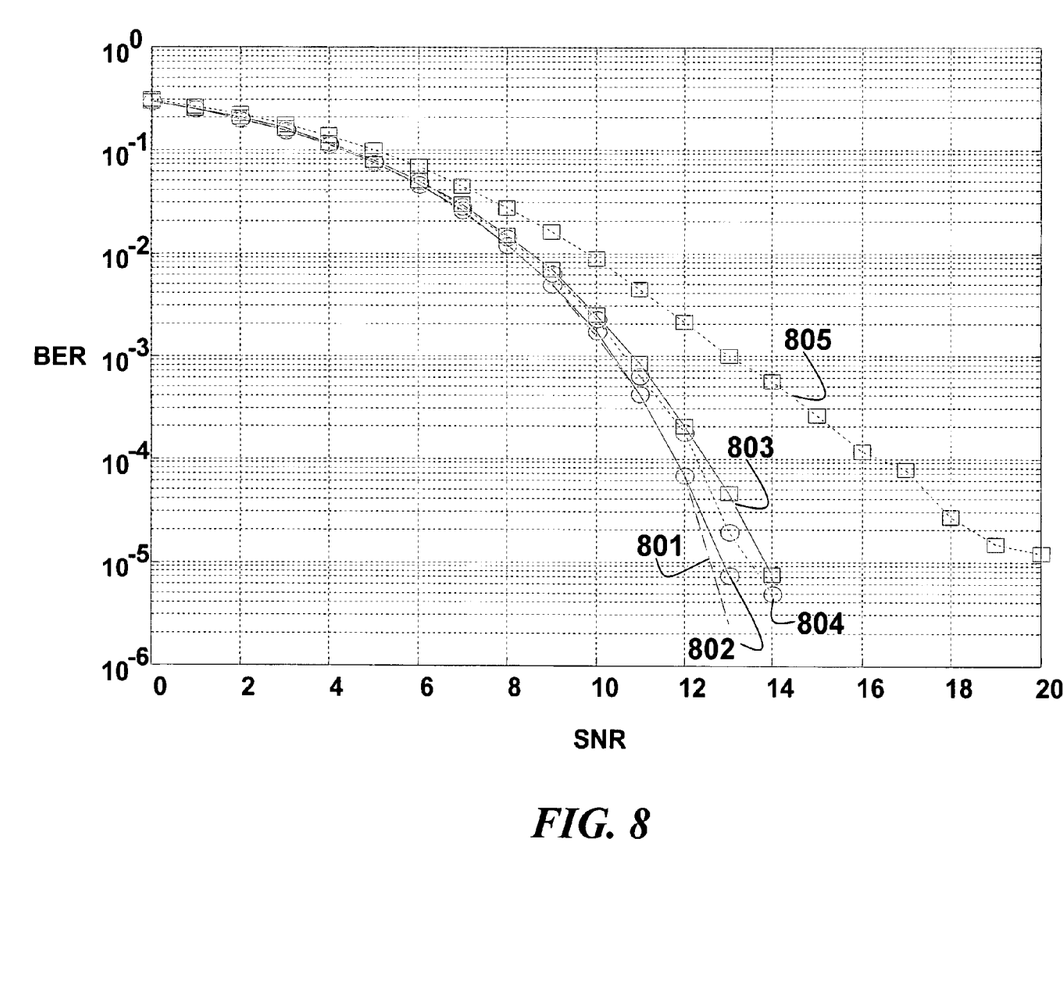
FIG. 8 is a graph of bit error rate performance of an OFDM system according to an embodiment of the invention.

FIG. 8 shows the bit error rate (BER) performance in an additive white Gaussian noise (AWGN) 801 channel for the 1st amplitude soft clipping with C=0.2, 2nd amplitude soft clipping with C=0.2, 1st amplitude soft clipping with C=0.4, and 1st amplitude soft clipping with C=0.4, 802-805 respectively, in the OFDM system according to an embodiment of the invention.

As shown in FIGS. 7 and 8, two clipping and filtering iterations can reduce the PAPR to 4 dB when C is set to 0.4, while PAPR reduction is achieved with a minimal increase in the BER, which can be compensated by turbo coding.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for reducing a peak-to-average power (PAPR) ratio in an orthogonal frequency division multiplexed signal, comprising a transmitter for performing steps of the method, comprising the steps of:

generating a baseband signal;
oversampling the baseband signal in a time domain;
clipping and filtering iteratively the oversampled signal in the time domain, wherein the clipping is soft clipping, and wherein the clipping according to a hyperbolic tangent function;
generating an analog baseband signal from the clipped and filtered oversample signal; and
up-converting the analog baseband signal to a desired RF carrier frequency.

2. The method of claim 1, in which the baseband signal is an orthogonal frequency division multiplexed signal.

3. The method of claim 1, further comprising:
converting a serial input signal to N parallel subcarrier signals; and
applying an inverse fast Fourier transform to each subcarrier signal to generate the baseband signal.

4. The method of claim 1, in which the oversampling further comprises:
inserting zeros between samples of the baseband signal; and
interpolating the baseband signal including the inserted zeros.

5. The method of claim 4, in which insertion rate is four.

6. The method of claim 1, in which the hyperbolic tangent function is $$s'_n = A \tanh(C|s_n|),$$

where A and C are predefined constants, and $S_n$ is a sample of the baseband signal.

7. The method of claim 6, in which C and A are selecting according to a PAPR reduction requirement.

8. The method of claim 6, in which C=0.8, and A=1/0.6.

9. The method of claim 1, in which the filtering is in the time domain.

10. A system for reducing a peak-to-average power (PAPR) ratio in an orthogonal frequency division multiplexed signal, comprising the steps of:
means for generating a baseband signal;
means for oversampling the baseband signal in a time domain;
means for clipping and filtering iteratively the oversampled signal in the time domain, wherein the clipping is soft clipping, and wherein the clipping according to a hyperbolic tangent function;
a digital to analog converter configured to convert the clipped and filtered oversample signal to an analog signal; and
a radio frequency transmitter configured to up-convert the analog baseband signal to a desired RF carrier frequency.

* * * * *